United States Patent
Cibaud et al.

(10) Patent No.: US 12,395,942 B2
(45) Date of Patent: Aug. 19, 2025

(54) METHOD FOR CONFIGURING AN ELECTRONIC DEVICE CONNECTED TO A COMMUNICATIONS NETWORK

(71) Applicant: Orange, Issy-les-Moulineaux (FR)

(72) Inventors: David Cibaud, Chatillon (FR); Julien Cumin, Chatillon (FR)

(73) Assignee: Orange, Issy-les-Moulineaux (FR)

( * ) Notice: Subject to any disclaimer, the term of this patent is extended or adjusted under 35 U.S.C. 154(b) by 350 days.

(21) Appl. No.: 17/980,923

(22) Filed: Nov. 4, 2022

(65) Prior Publication Data
US 2023/0132496 A1     May 4, 2023

(30) Foreign Application Priority Data
Nov. 4, 2021 (FR) ...................................... 2111709

(51) Int. Cl.
*H04W 52/18*     (2009.01)
*H04W 72/0453*     (2023.01)

(52) U.S. Cl.
CPC ....... *H04W 52/18* (2013.01); *H04W 72/0453* (2013.01)

(58) Field of Classification Search
CPC ........................... H04W 52/18; H04W 72/0453
See application file for complete search history.

(56) References Cited

U.S. PATENT DOCUMENTS

| | | | | |
|---|---|---|---|---|
| 8,516,109 B2 * | 8/2013 | Radier | .................. | H04L 67/303 |
| | | | | 709/224 |
| 9,137,613 B2 * | 9/2015 | El-Hoiydi | ............ | H04R 25/554 |
| 9,294,299 B2 * | 3/2016 | Jounay | .................... | H04L 45/68 |
| 9,456,420 B2 * | 9/2016 | Moon | .................... | H04W 52/24 |
| 9,590,934 B2 * | 3/2017 | Ye | ........................ | G06Q 30/0261 |
| 9,686,766 B2 * | 6/2017 | Shu | ........................ | H04W 4/029 |
| 9,980,681 B1 * | 5/2018 | LaBorde | ............... | A61B 5/0022 |
| 10,404,793 B2 * | 9/2019 | Ding | ....................... | H04W 4/08 |
| 10,515,360 B2 * | 12/2019 | Chow | ................ | G06K 7/10366 |
| 10,560,967 B2 * | 2/2020 | Moon | ................. | H04L 25/0398 |
| 10,956,936 B2 * | 3/2021 | McLeod | ............... | H04L 65/762 |

(Continued)

FOREIGN PATENT DOCUMENTS

| | | | | |
|---|---|---|---|---|
| EP | 3002984 A1 * | 4/2016 | ........... | H04B 1/7107 |
| WO | WO-2015027373 A1 * | 3/2015 | ....... | G06F 17/30241 |

OTHER PUBLICATIONS

Alcatel-Lucent et al., "Coverage enhancement mode operation", 3GPP Draft, R2-140728 Coverage Enhancement Mode Operations_ V01, 3rd Generation Partnership Project (3GPP), Mobile Competence Centre; 650, Route Des Lucioles; F-06921 Sophia-Antipolis Cedex; France, vol. RAN. Wg2, No. Prague, Czech Republic; Feb. 10, 2014-Feb. 14, 2014 Feb. 9, 2014 (Feb. 9, 2014), XP050792018.

(Continued)

*Primary Examiner* — Hai V Nguyen
(74) *Attorney, Agent, or Firm* — David D. Brush; Westman, Champlin & Koehler, P.A.

(57) ABSTRACT

A method for configuring an electronic device connected to a communications network is implemented in the electronic device. The method includes: obtaining at least one item of contextual information relating to the environment of the electronic device, and setting at least one configuration parameter of the electronic device to a value that depends on the at least one obtained item of contextual information.

20 Claims, 3 Drawing Sheets

(56) References Cited

U.S. PATENT DOCUMENTS

| | | | | |
|---|---|---|---|---|
| 11,694,229 | B2* | 7/2023 | McLeod | H04L 65/612 |
| | | | | 705/14.55 |
| 12,135,751 | B1* | 11/2024 | Wright | G06F 16/951 |
| 12,265,843 | B2* | 4/2025 | Lemoine | G06F 9/45558 |
| 2006/0193284 | A1* | 8/2006 | Stieglitz | H04L 63/1408 |
| | | | | 370/242 |
| 2007/0222674 | A1* | 9/2007 | Tan | G01S 19/49 |
| | | | | 342/357.32 |
| 2013/0304611 | A1* | 11/2013 | Shah | G06Q 30/06 |
| | | | | 705/26.61 |
| 2014/0229387 | A1* | 8/2014 | Chow | G06Q 20/3829 |
| | | | | 705/71 |
| 2014/0241171 | A1* | 8/2014 | Moon | H04L 25/0398 |
| | | | | 370/242 |
| 2016/0140788 | A1* | 5/2016 | Delevoye | G07C 9/00857 |
| | | | | 340/5.61 |
| 2016/0189223 | A1* | 6/2016 | McLeod | G06Q 30/0257 |
| | | | | 705/14.55 |
| 2016/0205652 | A1* | 7/2016 | Shu | H04W 64/00 |
| | | | | 455/456.1 |
| 2016/0374115 | A1* | 12/2016 | Moon | H04L 25/0398 |
| 2017/0048376 | A1* | 2/2017 | Logan | H04M 1/72415 |
| 2018/0176293 | A1* | 6/2018 | Ding | H04W 8/005 |
| 2020/0082396 | A1* | 3/2020 | Chow | G06Q 20/1085 |
| 2020/0314956 | A1* | 10/2020 | Berthet | H04W 52/0219 |
| 2021/0342885 | A1* | 11/2021 | McLeod | H04L 65/612 |
| 2022/0132557 | A1* | 4/2022 | Kuo | H04L 1/0009 |
| 2022/0174687 | A1* | 6/2022 | Kuo | H04W 72/23 |
| 2022/0179685 | A1* | 6/2022 | Lemoine | G06F 9/45558 |
| 2022/0303725 | A1* | 9/2022 | Barbu | H04W 64/00 |
| 2023/0014238 | A1* | 1/2023 | Pocovi | H04W 72/0446 |
| 2023/0269059 | A1* | 8/2023 | Kuo | H04L 5/005 |
| | | | | 370/329 |
| 2024/0007986 | A1* | 1/2024 | Barbu | G01S 5/0236 |
| 2024/0130024 | A1* | 4/2024 | Gaw | G01N 21/84 |
| 2024/0211858 | A1* | 6/2024 | Skaaksrud | G06Q 10/087 |
| 2024/0244571 | A1* | 7/2024 | Kuo | H04L 5/0078 |
| 2024/0291607 | A1* | 8/2024 | Sahin | H04W 64/00 |
| 2024/0311460 | A1* | 9/2024 | Salter | G06V 40/18 |
| 2024/0333656 | A1* | 10/2024 | Wang | H04W 72/11 |
| 2024/0373434 | A1* | 11/2024 | Zia | H04W 88/06 |

OTHER PUBLICATIONS

French Search Report and Written Opinion dated Jun. 15, 2022 for corresponding French Application No. 2111709, filed Nov. 4, 2021.

* cited by examiner

[Fig. 1]
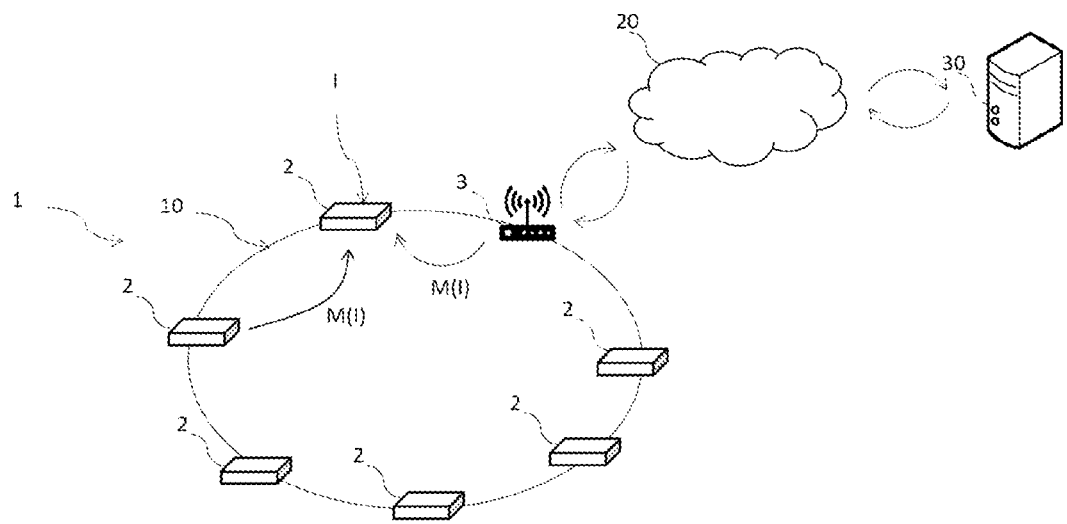
[Fig. 2a]
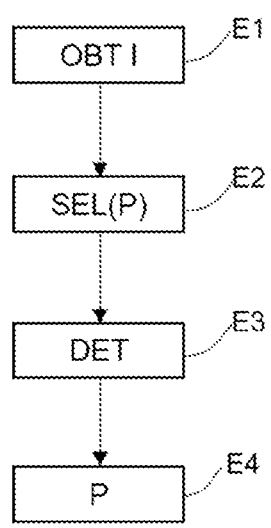

[Fig. 2b]
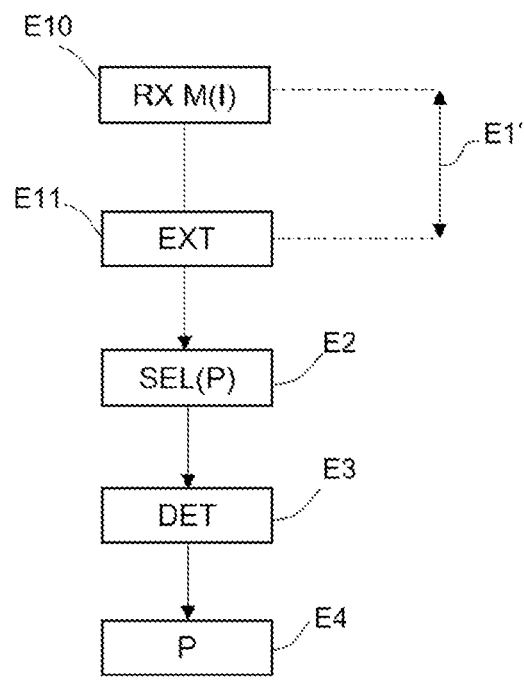
[Fig. 3]
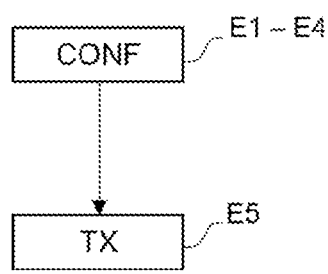

[Fig.4a]
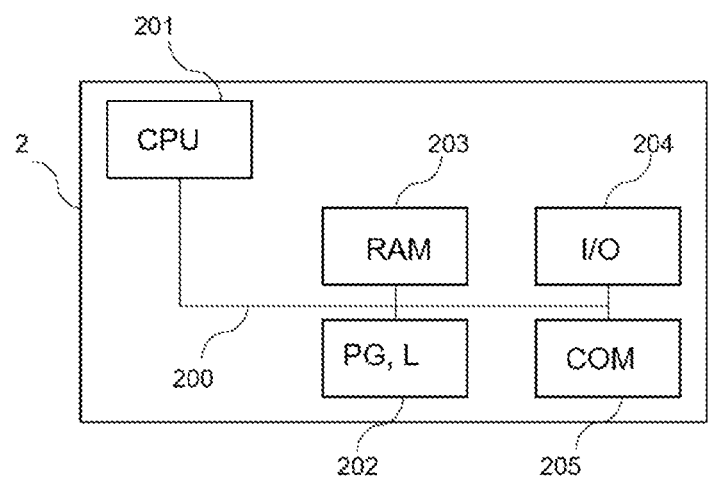
[Fig.4b]
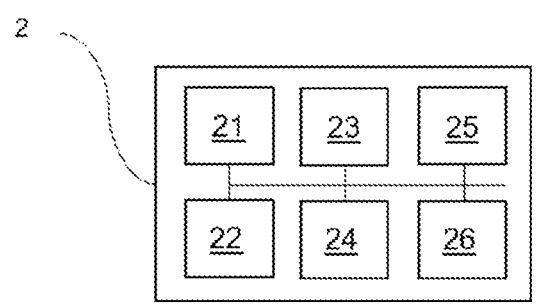

METHOD FOR CONFIGURING AN ELECTRONIC DEVICE CONNECTED TO A COMMUNICATIONS NETWORK

CROSS-REFERENCE TO RELATED APPLICATIONS

This application claims priority to and the benefit of French Patent Application No. 2111709, filed Nov. 4, 2021, the content of which is incorporated herein by reference in its entirety.

FIELD OF THE DISCLOSURE

The present disclosure relates to a method for configuring an electronic device, such as a connected object.

It furthermore relates to a method for transmitting a message, said method being implemented by an electronic device that has been configured by a configuration method according to the invention.

The disclosure applies in particular to connected objects, and notably to connected objects that are configured to regularly transmit messages.

BACKGROUND OF THE DISCLOSURE

The use of connected objects is continuing to increase. It is nowadays common to find environments in which a very large number of connected objects are installed. Environments (for example buildings, factories, towns, etc.) in which there are installed hundreds or even thousands of objects connected to a communications network are known. These connected objects may be for example sensors of any type able to send data, via a communications network, to an equipment, such as a server, which collects these data.

In this type of environment in which a large number of objects are installed, the overall consumption of energy is significant. One of the operations that uses a large amount of energy for a connected object is that of transmitting messages using wireless technologies, in spite of the efforts to reduce the consumption of the protocols that are used. However, transmitting certain messages sometimes proves needless, and the energy consumed when transmitting these messages is consumed needlessly.

Furthermore, it is often the case that connected objects are supplied with power by cells or batteries, with connection to an electricity supply grid not being possible or being difficult or undesirable for various reasons. In this type of object supplied with power by cells or batteries, it is all the more important to reduce energy consumption in order to reduce the replacement of the cells or batteries as far as possible. Furthermore, replacing the cells or the batteries of an object may prove difficult or even impossible due to the location of the object.

There is thus a need to reduce the consumption of connected objects, or at the very least to optimize it, more particularly the consumption of connected objects that are not supplied with power by an electricity supply grid.

SUMMARY

An exemplary embodiment of the present disclosure aims to optimize the consumption of electronic devices connected to a communication network, such as connected objects.

To this end, according to a first aspect, the disclosure targets a method for configuring an electronic device connected to a communications network, said method being implemented by said electronic device.

According to an exemplary embodiment, the method comprises:
obtaining at least one item of contextual information relating to the environment of the electronic device, and
setting at least a configuration parameter od the electronic device of the electronic device to a value that depends on said at least one obtained item of contextual information, said at least a configuration parameter being the message transmission frequency.

The electronic device is thus configured taking into account the environment in which it is installed. The operation of the electronic device configured in this way is therefore adapted to its environment, consuming energy when necessary and saving energy when possible. The energy consumption of the electronic device is thus optimized.

The electronic device is furthermore configured once it has been installed in the environment in which it is used and once it has been connected to the communications network. Its configuration thus takes into account the actual conditions surrounding it.

An item of contextual information relating to the environment of the electronic device corresponds to any item of information relating to the context in which the electronic device is located, or in other words to any item of information relating to the conditions surrounding the electronic device. The item of contextual information may take the form of a parameter characterizing the environment of the electronic device. It will be noted that a set of items of contextual information relating to the environment of an electronic device describes or defines the environment of the device or, in other words, the environment of a device may be defined by a set of items of contextual information. There are many examples of items of contextual information, and these may be for example ambient conditions such as the temperature or the humidity of the air surrounding the device, the ambient light level, the ambient noise level, temporal conditions such as the date or the time, conditions such as the presence or the absence of a person or of an object close to the device, the identity of a person close to the device (for example interacting with the device), etc.

In the obtaining step, the electronic device may obtain one or more items of contextual information.

Configuring the electronic device comprises setting a parameter relating to the transmission to a predetermined value depending on an obtained item of contextual information. The electronic device is therefore configured to transmit messages taking into account its environment. In other words, since the transmission operations are parameterized depending on at least one item of contextual information relating to the environment of the device, they are conditional upon the environment.

Thus, since the transmission operations are adapted to the environment of the electronic device, the energy consumption in relation to the transmission operations is optimized with respect to the environment of the device.

For example, the electronic device may transmit messages more or less frequently depending on certain conditions of its surroundings.

According to one feature, the method furthermore comprises setting a parameter defining message transmission times.

A message transmission time defines the time at which a message is transmitted. For example, the parameter defining message transmission times may correspond to a transmission frequency or to a condition required for a message to be transmitted.

For example, a temperature sensor installed in a room and sending measured temperature values to a server managing an air-conditioning system for the room may configure its transmission parameters so as to transmit the temperature values more or less often depending on the environment of the sensor. Indeed, depending on the situation, for example depending on the time of day or depending on whether or not the home is occupied, sending information relating to the temperature may prove useful or needless. For example, a temperature fluctuation with respect to a target temperature used to regulate the temperature of a room may have more or less impact on the occupants of the home depending on whether the temperature variation takes place during the day or during the night.

According to one example, the sensor may be configured to feed back temperature values to the server periodically, the message transmission frequency being able to be set to different values depending on the obtained time. To this end, the temperature sensor may for example set the transmission frequency to a first value when the obtained time is between 8 a.m. and 12 a.m. and to a second value lower than the first value when the obtained time is outside the abovementioned time range. It will be noted that, in this example, the item of contextual information obtained by the sensor is the time and that the configuration parameter of the sensor is a parameter relating to the transmission of messages.

According to another exemplary configuration of the temperature sensor, the sensor may be configured to send a message to the server when the temperature varies with respect to a target temperature set by a user (sending messages according to a condition). For example, a sensor may be configured to transmit a message when the temperature of the room, with respect to a target temperature, varies by 1° C. during the day, and as soon as night falls (or starting from a predefined time), the sensor is reconfigured to transmit a message when the temperature difference is 3° C. By virtue of the configuration of the sensor, the number of messages sent during the night is lower than the number of messages sent during the day. It will be noted that, in this example, the item of contextual information may be the time, but also a datum representative of ambient brightness, received for example from a brightness sensor installed in the room.

Thus, by virtue of an exemplary embodiment, depending on an item of information relating to the environment of the sensor, for example whether it is daytime or night-time, whether the room is occupied or empty, etc., the sensor may be configured to transmit messages more or less often.

The electronic device thus transmits messages depending on its environment, avoiding transmitting messages in situations where it is not necessary to transmit messages and reserving the transmission of messages to situations in which it is necessary to transmit messages.

Since the messages are transmitted only when necessary, the energy consumption of the electronic device is optimized, and very often reduced. In other words, it should be noted that, by limiting the transmission of messages to situations in which transmission thereof proves necessary, the energy consumption of the electronic device may be reduced.

According to another example, the method furthermore comprises setting a parameter defining the message transmission power.

The electronic device is thus configured to transmit messages with a higher or lower transmission power as required. For example, when the item of contextual information gives an indication of the distance at which an object intended to receive the messages transmitted by the electronic device is located, the message transmission power is adapted according to this distance. It will be noted that, if the recipient object is moved, the electronic device may be reconfigured to take into account the new location of the recipient object.

According to one feature, the configuration method furthermore comprises selecting a parameter depending on said at least one obtained item of contextual information.

The parameter to be configured depends on the received item of contextual information or on the type of the obtained item of contextual information. For example, if the item of contextual information corresponds to an indication of the distance at which the object intended to receive the messages is located, the selected parameter may be the message transmission power.

To this end, the electronic device may consult a table listing items of contextual information, each item of contextual information having associated with it a configuration parameter of the electronic device. This table is for example stored in the memory of the electronic device.

According to one feature, the configuration method furthermore comprises determining the value of said at least one message transmission frequency depending on said obtained contextual value.

According to one feature, obtaining at least one item of contextual information comprises receiving a message containing said at least one item of contextual information.

In this embodiment, the item of contextual information is obtained by an equipment connected to the communications network and different from the electronic device. The electronic device receives the item of contextual information inserted into a message, obtaining the item of contextual information consisting in extracting this item of contextual information from the received message.

In one embodiment, the message containing said at least one item of contextual information is received from an access device allowing the communications network to access another communications network.

The access device may obtain the item of contextual information itself or receive it from a second electronic device connected to the communications network.

In another embodiment, the message containing said at least one item of contextual information is received from a second electronic device connected to said communications network.

In this embodiment, the message containing said at least one item of contextual information does not transit via the access device, but is sent directly to the electronic device.

It will be noted that the second electronic device is different from the electronic device implementing the configuration method.

According to one feature, said at least one obtained item of contextual information has been signed beforehand by a trusted third party.

The signature of the item of contextual information obtained by the electronic device guarantees the authenticity of the item of contextual information and avoids malicious attempts to configure or reconfigure the electronic device.

A trusted third party may be for example an entity such as a certification authority that certifies the authenticity of the item of contextual information. The trusted third party provides a signature digitally, for example an asymmetric cryptographic signature.

In another embodiment, the item of contextual information is obtained by the electronic device itself.

For example, the electronic device is configured to obtain it itself from the items of contextual information relating to its environment. For example, the electronic device may comprise sensors such as a temperature sensor and/or humidity sensor able to obtain the temperature and/or the humidity of the air surrounding the sensor. The electronic device may also comprise an internal clock, by way of which the electronic device is able to obtain the time.

The features of the configuration method presented above may be taken alone or in combination with one another.

According to a second aspect, the present disclosure relates to an electronic device connected to a communications network and comprising:
- an obtainment module configured to obtain at least one item of contextual information relating to the environment of the electronic device, and
- a setting module configured to set at least a configuration parameter of the electronic device to a value that depends on said at least one obtained item of contextual information, said at least configuration parameter being the message transmission frequency.

According to one feature, the electronic device furthermore comprises a transmission module configured to transmit a message.

According to a third aspect, the present disclosure relates to a system comprising a set of electronic devices connected to a communications network, wherein at least one electronic device of the set is in accordance with the present disclosure.

According to a fourth aspect, the present disclosure relates to a method for transmitting a message, said method being implemented by an electronic device and comprising:
- configuring the device, comprising setting at least the message transmission frequency to a value that depends on at least one obtained item of contextual information, and
- transmitting a message once the configuration has been carried out.

It will be noted that the transmission method is implemented by an electronic device that has been configured in accordance with the configuration method according to an embodiment of the disclosure.

According to a fifth aspect, the present disclosure relates to a program for an electronic device, comprising program code instructions intended to command the execution of the steps of the configuration method according to an embodiment of the disclosure and/or the transmission method according to an embodiment of the disclosure.

According to a sixth aspect, the present disclosure relates to an information medium able to be read by a processor in an electronic device and on which the computer program according to t an embodiment of the disclosure is recorded.

The electronic device, the transmission method, the system, the program and the medium able to be read by a processor have features and advantages analogous to those described above in relation to the configuration method.

Other particular features and advantages of exemplary embodiments of the disclosure will become more clearly apparent in the following description.

BRIEF DESCRIPTION OF THE DRAWINGS

In the appended drawings, which are given by way of non-limiting examples:

FIG. 1 shows a system able to implement exemplary embodiments of the disclosure;

FIG. 2a illustrates steps of the configuration method according to a first embodiment;

FIG. 2b illustrates steps of the configuration method according to a second embodiment;

FIG. 3 illustrates steps of the transmission method according to one embodiment of the disclosure;

FIG. 4a illustrates a hardware architecture able to implement the configuration method and/or the transmission method according to an embodiment of the disclosure; and FIG. 4b is a functional depiction of an electronic device according to one embodiment of the disclosure.

DETAILED DESCRIPTION OF ILLUSTRATIVE EMBODIMENTS

The present disclosure applies in particular to any connected or communicating object, that is to say to any object configured to communicate (transmit or receive data) with other equipments.

In the remainder of this document, the term object or connected object will be used indiscriminately.

FIG. 1 shows a system able to implement one embodiment of the disclosure. The system 1 comprises a set of electronic devices 2 connected to a communications network 10.

An electronic device 2 may be a connected object (or communicating object), or form part of a connected object. In the description below, it is considered that the electronic device is a connected object.

The connected objects 2 may be of various types and be used for numerous applications. Some examples of connected objects are a mobile telephony terminal, a laptop computer, a tablet, a gateway, a printer, an audio speaker, a set-top box, a television set, a games console, a household appliance, a sensor, a camera, a watch, glasses, etc. The connected objects 2 are used in numerous contexts and for numerous applications.

An access device 3, such as an access gateway, allowing access to a second communications network 20, is also connected to the communications network 10. For example, the first communications network 10 is a LAN (for "Local Area Network") network, such as a home network or a company network, and the second communications network 20 is a wide area network 20 or WAN network, such as the Internet.

The connected objects 2 and the access gateway 3 are configured to exchange data with one another, at least through wireless communications, for example in accordance with a Wi-Fi (for "Wireless Fidelity", registered trademark) protocol. Conventionally, the access gateway 3 allows the connected objects 2 to communicate with equipments forming part of the second communications network 20, for example servers 30.

Furthermore, the connected objects 2 are able to communicate with one another in peer-to-peer mode, or in other words without going through the access gateway 3. Peer-to-peer communications may be implemented using numerous technologies, such as Bluetooth (registered trademark), Wi-Fi, Wi-Fi Direct, LTE (Long Term Evolution), etc.

The electronic device 2 will be described in more detail with reference to FIGS. 4a and 4b. It is configured to implement the proposed configuration method and/or the proposed transmission method. The configuration and transmission methods will be described in detail with reference to FIGS. 2a, 2b and 3.

The connected objects may be preconfigured in the factory or once they have been installed in the field. By virtue of an exemplary embodiment of the present disclosure, the connected objects may be configured and reconfigured in the field, as many times as necessary and in real time, taking into account variations in the environment of the connected object, such as the time interval, ambient conditions (temperature, humidity, etc.), movement, and the addition or the removal of an object to or from the environment.

FIGS. 2a and 2b show steps of the configuration method according to a first embodiment and a second embodiment, respectively.

The configuration method may be implemented at different times, for example when the connected object is first installed, when it is powered on, periodically (for example every hour), at preprogrammed times, etc. According to other embodiments, the method may be implemented upon receipt of a specific message, this message possibly originating from another object or from the object itself. This specific message may for example indicate a change in the environment and/or contain an item of contextual information, with reconfiguration of the object proving useful. According to the embodiments, this specific message may be generated by another object (for example another sensor) or by the object itself (for example when it detects a change in the environment). In another embodiment, the specific message may contain a configuration request intended to trigger the implementation of the configuration method.

The configuration method is implemented by a connected object and comprises obtaining E1, E1' at least one item of contextual information I relating to the environment of the object 2.

Thus, as indicated below, an item of contextual information I may be obtained E1, E1' at different times, for example regularly or as soon as a change in the environment is detected by the object itself or by another object, etc.

In a first embodiment (FIG. 2a), the connected object 2 is configured to obtain the item of contextual information by itself. In this embodiment, the connected object configures itself autonomously, without requiring any information from other equipments.

As indicated above, the items of contextual information are varied and may give any type of indication about the context in which the connected object is located. The connected object is thus able to obtain, according to the embodiment, one or more items of contextual information. To this end, the connected object may comprise a sensor or multiple sensors, for example one or more temperature sensors, motion sensors, light sensors, humidity sensors, etc., and be configured to obtain an item of contextual information at least using one of these sensors. The connected object may also comprise an internal clock device.

Some examples of items of contextual information are a temperature value, humidity value, brightness level value, a value indicating the presence or the absence of a person nearby, the current time, etc.

In one embodiment, the connected object may be configured to determine the power level of a received signal, this level being representative of the distance between the connected object and the object transmitting the signal.

In another embodiment, such as the one shown in FIG. 2b, obtaining E1' at least one item of contextual information I comprises receiving E10 a message M containing the item of contextual information. The receipt E10 of the message is followed by extraction E11 of the item of contextual information I from the received message M.

The origin of the messages M may be different depending on the embodiment.

In one embodiment, the message containing the item of contextual information is received from the access device 3 allowing the first communications network 10 to access the second communications network 20. The access device 3 may obtain the item of contextual information itself or receive it from another object, for example another object connected to the first communications network (a sensor for example).

In this last embodiment, the connected object 2 obtains the item of contextual information from a second object connected to the communications network 10 via the access device 3.

In another embodiment, the message M containing the item of contextual information is received directly from the second object connected to the communications network 10.

In one embodiment, the item of contextual information has been signed beforehand by a trusted third party. Depending on the embodiment, this trusted third party may be the access device 3 transmitting the message M to the connected object 2, or another equipment of the first communications network 10 (for example a mobile belonging to a user) or of the second communications network 20. It will be noted that the access device 3 may act as trusted third party if the messages exchanged between the objects transit via this access device. It will furthermore be noted that radio communication protocols such as Wi-Fi, Bluetooth, ZigBee, etc. natively integrate encryption functions that secure the exchanges of data between the objects.

The data signature operations are known and will not be described here.

It will be noted that these two embodiments may be combined. For example, the connected object may obtain one or more items of contextual information by itself (FIG. 2a) and receive one or more items of contextual information from another connected object (FIG. 2b).

Once the item of contextual information has been obtained, a configuration parameter P is selected E2 depending on the type of the obtained item of contextual information I.

According to one embodiment, the configuration parameter P may be selected using a list L listing pairs formed respectively by an item of contextual information and an associated parameter. Such a list may be stored in the memory of the connected object 2 and may be updated depending on the evolution of the constitution of the communications network 10. In other embodiments, this list may be stored in the memory of another equipment of the network, for example the access device 3.

By way of completely non-limiting example, a list L may take the following form. Of course, other items of information and other parameters and also other associations between the two are possible.

| Item of contextual information | Parameter |
|---|---|
| Presence or absence of a person | Transmission frequency |
| Time | Transmission frequency |
| Time | Condition/threshold defining the transmission of a message |
| Signal reception level | Transmission power |
| Geolocation data of a user | Transmission frequency |

It will be noted that this selection step E2 is optional and that some connected objects do not implement it. For example, according to one embodiment, the parameter to be configured is indicated in the received message containing the item of contextual information. According to another embodiment, the configuration parameter is already preselected or selected by default.

In one embodiment, the configuration parameter is a parameter relating to the transmission of messages. For example, the configuration parameter may be a parameter defining the message transmission time. According to another example, the configuration parameter may be a parameter defining the message transmission power.

Next, the value of the parameter is determined E3 depending on the obtained item of contextual information and the configuration parameter P is set E4 to this determined value. By way of completely non-limiting example, the value of the configuration parameter P is determined from a correspondence table created by the manufacturer of the connected object, in which each value or interval of values of the item of contextual information is associated with a value of a parameter P. For example, in the case of a temperature sensor periodically transmitting measured values, the correspondence table associates times (or time ranges) with transmission frequency values, respectively.

In another example, the value of the configuration parameter P is calculated using a mathematical function created by the manufacturer and involving the item of contextual information in the calculation.

Of course, the configuration method may comprise setting multiple configuration parameters to values that depend on one or more items of contextual information. For example, the transmission frequency and transmission threshold of a temperature sensor may be calculated based on the period of the day and on the room in which the sensor is installed (some rooms not having the same requirements for a comfortable temperature).

In other embodiments, multiple items of contextual information are obtained, but a single configuration parameter is modified. The value to which the configuration parameter is set may be determined taking into account one or more items of contextual information from among the obtained items of contextual information.

FIG. 3 shows steps of the transmission method according to one embodiment.

This transmission method comprises configuring the connected object 2 by implementing one embodiment of the configuration method described above (E1, E2, E3, E4).

Once the connected object 2 has been configured, a message is transmitted E5 by the connected object. This message may be transmitted to various equipments, such as another connected object, the access device 3 or a server connected to the access device 3 via the second communications network 20.

By way of completely non-limiting example, the electronic device may be a temperature sensor installed in a home and sending information relating to the temperature of a room to a server managing an air-conditioning system for the home. According to various configurations of the sensor, the temperature of the room may be fed back to the server periodically (with a determined frequency), or else the sensor may send a message to the server when the temperature varies with respect to a target temperature set by a user (according to a condition).

Depending on the situation, for example depending on the time of day or depending on whether or not the home is occupied, sending information relating to the temperature may prove useful or needless. For example, a temperature fluctuation with respect to a target temperature used to regulate the temperature of a room may have more or less impact on the occupants of the home depending on whether the temperature variation takes place during the day or during the night.

Thus, by virtue of an embodiment of the disclosure, depending on an item of information relating to the environment of the sensor, for example whether it is daytime or night-time, whether the room is occupied or empty, etc., the sensor may be configured to transmit messages more or less often. For example, a sensor may be configured to transmit a message when the temperature of the room, with respect to a target temperature, varies by 1° C. during the day, and as soon as night falls (or starting from a predefined time), the sensor is reconfigured to transmit a message when the temperature difference is 3° C.

According to another example, a brightness level sensor may configure its transmission parameters so as to transmit messages relating to brightness only in time ranges during which changes in brightness take place, rather than transmitting messages relating to brightness throughout the entire day. The messages relating to brightness are for example used by another connected object controlling the position of a shutter or of a parasol. In this example, the item of contextual information obtained by the sensor is the time, and the configuration parameters of the device are configured to send or not send messages depending on the time. Since the transmission of messages by the sensor is adapted to the context in which the sensor is located, the energy consumption of the sensor is optimized.

Of course, one or more embodiments of the present disclosure applies to any other type of sensor or any other type of connected object. A person skilled in the art knows how to apply the proposed methods and devices to any other type of connected object.

FIG. 4a schematically illustrates a hardware architecture of an electronic device able to implement the proposed configuration method and/or the proposed transmission method.

The electronic device 2 comprises a communication bus 200 to which the following are connected:
- a processing unit 201, called CPU (for "central processing unit") in the figure and possibly comprising one or more processors;
- a non-volatile memory 202, for example a ROM (for "read-only memory"), an EEPROM (for "electrically erasable programmable read-only memory") or a flash memory;
- a random access memory 203 or RAM;
- an input/output interface 204, called I/O in the figure, for example keys or buttons, a screen, a keypad, a mouse or another pointing device such as a touchscreen or a remote controller allowing a user to interact with the equipment 2 via a graphical interface or a human-machine interface; and
- a communication interface 205, called COM in the figure, designed to exchange data for example with other electronic devices 2, 3 or with a server 30 via a communications network 10, 20.

The random access memory 203 contains registers designed to record the variables and parameters that are created and modified during the execution of a computer program comprising instructions for implementing the proposed configuration method and/or the proposed transmission method. The instruction codes of the program stored in the non-volatile memory 202 are loaded into the RAM memory 203 in order to be executed by the processing unit CPU 201.

The non-volatile memory 202 is for example a rewritable EEPROM memory or flash memory able to constitute a medium within the meaning of an embodiment of the disclosure, that is to say able to comprise a computer program PG comprising instructions for implementing the proposed configuration method and/or the proposed transmission method. The rewritable memory may comprise for example a table listing items of contextual information with associated configuration parameters.

This program PG, by way of its instructions, defines functional modules of the electronic device 2 that are implemented and/or control the hardware elements described above. FIG. 4b is a functional depiction of an equipment according to one embodiment.

These modules may comprise in particular:
- an obtainment module 21 for obtaining an item of contextual information relating to the environment of the electronic device,
- a setting module 22 for setting at least one configuration parameter of the electronic device to a value that depends on said at least one obtained item of contextual information,
- a transmission module 23 for transmitting a message.

According to some embodiments, the electronic device may comprise:
- a selection module 24 configured to select at least one parameter depending on the obtained item of contextual information;
- a determination module 25 configured to determine a value of a parameter depending on the obtained item of contextual information; and/or
- a transmission module 26 configured to transmit messages.

The abovementioned modules and means are driven by the processor of the processing unit 201. They may take the form of a program able to be executed by a processor, or a hardware form, such as an application-specific integrated circuit (ASIC), a system on chip (SoC), or a programmable logic circuit-type electronic component, such as an FPGA (for "field-programmable gate array") component.

Thus, by virtue of one or more embodiments of the disclosure, an electronic device may be configured taking into account the environment in which it is installed, this configuration taking into account the conditions surrounding the object in real time. The operation of the electronic device is therefore adapted to its environment, consuming energy when necessary and saving energy when possible. The energy consumption of the electronic device is thus optimized.

Although the present disclosure has been described with reference to one or more examples, workers skilled in the art will recognize that changes may be made in form and detail without departing from the scope of the disclosure and/or the appended claims.

What is claimed is:

1. A method for configuring an electronic device connected to a communications network, said method being implemented in said electronic device and comprising:
    obtaining at least one item of contextual information relating to the environment of the electronic device, and
    setting at least a configuration parameter of the electronic device to a value that depends on said at least one obtained item of contextual information, said at least a configuration parameter being a message transmission frequency.

2. The configuration method as claimed in claim 1, furthermore comprising setting a parameter defining a message transmission time.

3. The configuration method as claimed in claim 1, furthermore comprising setting a parameter defining a message transmission power.

4. The configuration method as claimed in claim 1, furthermore comprising selecting a parameter depending on said at least one obtained item of contextual information.

5. The configuration method as claimed in claim 1, wherein said obtaining at least one item of contextual information comprises receiving a message containing said at least one item of contextual information.

6. The configuration method as claimed in claim 5, comprising receiving said message containing said at least one item of contextual information from an access device allowing said communications network to access another communications network.

7. The configuration method as claimed in claim 5, comprising receiving said message containing said at least one item of contextual information from a second electronic device connected to said communications network (10).

8. The configuration method as claimed in claim 1, wherein said at least one item of contextual information has been signed beforehand by a trusted third party.

9. An electronic device connected to a communications network, said electronic device comprising:
    a processing unit comprising at least one processor; and
    a non-transitory computer readable medium comprising instructions stored thereon which when executed by the processing unit configure the electronic device to:
    obtain at least one item of contextual information relating to the environment of the electronic device, and
    set at least a configuration parameter of the electronic device to a value that depends on said at least one obtained item of contextual information, said at least one configuration parameter comprising a message transmission frequency.

10. The electronic device as claimed in claim 9, furthermore comprising a transmitter to transmit messages at said message transmission frequency.

11. The electronic device as claimed in claim 9, wherein said instructions stored thereon, when executed by the processing unit, furthermore configure the electronic device to set a parameter defining a message transmission time.

12. The electronic device as claimed in claim 9, wherein said instructions stored thereon, when executed by the processing unit, furthermore configure the electronic device to set a parameter defining a message transmission power.

13. The electronic device as claimed in claim 9, wherein said instructions stored thereon, when executed by the processing unit, furthermore configure the electronic device to select a parameter depending on said at least one obtained item of contextual information.

14. The electronic device as claimed in claim 9, wherein said instructions stored thereon, when executed by the processing unit, furthermore configure the electronic device to receive a message containing said at least one item of contextual information.

15. The electronic device as claimed in claim 14, wherein said instructions stored thereon, when executed by the processing unit, furthermore configure the electronic device to receive said message containing said at least one item of contextual information from an access device allowing said communications network to access another communications network.

16. The electronic device as claimed in claim 14, wherein said instructions stored thereon, when executed by the processing unit, furthermore configure the electronic device to receive said message containing said at least one item of contextual information from a second electronic device connected to said communications network.

17. A system comprising a set of electronic devices connected to a communications network, wherein at least one electronic device of the set is as claimed in claim 9.

18. A method for transmitting a message, said method being implemented by an electronic device and comprising:
    configuring the electronic device, comprising setting at least a message transmission frequency to a value that depends on at least one obtained item of contextual information, and
    transmitting a message once the configuration has been carried out.

19. A non-transitory computer readable medium comprising program code instructions recorded thereon which, when executed by a processing unit of an electronic device connected to a communications network, implement a method for configuring the electronic device, the method comprising:
    obtaining at least one item of contextual information relating to the environment of the electronic device, and
    setting at least a configuration parameter of the electronic device to a value that depends on said at least one obtained item of contextual information, said at least a configuration parameter being a message transmission frequency.

20. A non-transitory computer readable medium comprising program code instructions recorded thereon which, when executed by a processing unit of an electronic device connected to a communications network, implement a method for transmitting a message, the method comprising:
    setting at least a message transmission frequency to a value that depends on at least one obtained item of contextual information, and
    transmitting a message once the configuration has been carried out.

* * * * *